United States Patent
Flanagan et al.

(10) Patent No.: US 7,230,919 B2
(45) Date of Patent: Jun. 12, 2007

(54) QUALITY-OF-SERVICE MONITOR FOR VOICE-OVER-INTERNET-PROTOCOL CALLS

(75) Inventors: Mark Flanagan, Boynton Beach, FL (US); Kristin Butcher, Deerfield Beach, FL (US); David Richardson, Boca Raton, FL (US); Kenton Cross, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 1037 days.

(21) Appl. No.: 09/779,012

(22) Filed: Feb. 7, 2001

(65) Prior Publication Data

US 2002/0105909 A1   Aug. 8, 2002

(51) Int. Cl.
*G01R 31/09* (2006.01)
*H04L 12/66* (2006.01)

(52) U.S. Cl. ............... 370/230; 370/235; 370/352

(58) Field of Classification Search ........ 370/230–235, 370/352–356, 401, 402, 465, 466, 235.1, 370/244, 245, 253; 714/704; 379/221.01, 379/900

See application file for complete search history.

(56) References Cited

U.S. PATENT DOCUMENTS

| | | | | |
|---|---|---|---|---|
| 5,153,877 A | * | 10/1992 | Esaki et al. | 370/389 |
| 5,390,188 A | * | 2/1995 | Dawson | 714/717 |
| 5,809,110 A | * | 9/1998 | Ulrich et al. | 379/30 |
| 6,192,031 B1 | * | 2/2001 | Reeder et al. | 370/230 |
| 6,304,567 B1 | * | 10/2001 | Rosenberg | 370/356 |
| 6,389,005 B1 | * | 5/2002 | Cruickshank | 370/352 |
| 6,510,219 B1 | * | 1/2003 | Wellard et al. | 379/221.01 |
| 6,542,499 B1 | * | 4/2003 | Murphy et al. | 370/352 |
| 6,657,957 B1 | * | 12/2003 | Cheung et al. | 370/230 |
| 6,665,293 B2 | * | 12/2003 | Thornton et al. | 370/352 |
| 6,745,352 B2 | * | 6/2004 | Cheng | 714/704 |
| 6,747,953 B1 | * | 6/2004 | Qureshi et al. | 370/235 |
| 2002/0110112 A1 | * | 8/2002 | Tuomi | 370/352 |

* cited by examiner

*Primary Examiner*—Doris H. To
*Assistant Examiner*—Ian N. Moore

(57) ABSTRACT

During voice-over-Internet-protocol calls, data are gathered about packet loss on the path over the IP network. An algorithm (in the preferred embodiment, the Sliding Window Exponential Average Algorithm) is used to evaluate the packet loss. The Sliding Window Exponential Average Algorithm allows for past performance to be considered along with current performance. If the resulting evaluation fails to meet predetermined criteria, the path over the IP network is blocked and calls are routed over an alternative.

6 Claims, 5 Drawing Sheets

| Interval | $S_i$ | $V_{i-1}$ | Eqn $\frac{1}{3}S_i + \frac{2}{3}V_{i-1}$ | Expansion | Value |
|---|---|---|---|---|---|
| 0 | 1 | n/a | (1) | | 1 |
| 1 | 2 | 1 | $\frac{1}{3}(2) + \frac{2}{3}(1)$ | | $\frac{4}{3} = 1\frac{1}{3}$ |
| 2 | 3 | $\frac{4}{3}$ | $\frac{1}{3}(3) + \frac{2}{3}(\frac{4}{3})$ | $\frac{1}{3}(3) + \frac{2}{3}[\frac{1}{3}(2) + \frac{2}{3}(1)]$ | $\frac{17}{9} = 1\frac{8}{9}$ |
| 3 | 1 | $\frac{17}{9}$ | $\frac{1}{3}(1) + \frac{2}{3}(\frac{17}{9})$ | $\frac{1}{3}(1) + \frac{2}{3}\{\frac{1}{3}(3) + \frac{2}{3}[\frac{1}{3}(2) + \frac{2}{3}(1)]\}$ | $\frac{43}{27} = 1\frac{16}{27}$ |

302

304

QUALITY-OF-SERVICE MONITOR FOR VOICE-OVER-INTERNET-PROTOCOL CALLS

FIELD OF THE INVENTION

The present invention relates to voice-over-Internet-protocol telephony systems.

BACKGROUND OF THE INVENTION

In voice-over-Internet-protocol (VoIP) telephony systems, voice calls are digitized, assembled into packets, and then directed over Internet protocol (IP) networks instead of being sent via the Switched Circuit Network (SCN). The SCN includes networks such as the Integrated Services Digital Network (ISDN) and the Public Switched Telephone Network (PSTN). Internet technologies were originally designed to handle the transport of data resilient to delays, jitter, and retransmissions, all of which can result in packet loss. Voice and other real-time media are much more sensitive to these inevitable IP network characteristics. IP instabilities can cause gaps in voice transmission, clicks and other background noises, and distortions. Acceptable quality of service (QoS) is a major concern in VoIP.

Currently, there is no system that ensures that VoIP calls are routed with acceptable quality. What is needed is a VoIP system that checks route quality and routes VoIP calls only over routes that meet a quality criterion.

SUMMARY OF THE INVENTION

The system collects values that represent a history of packet loss statistics as well as current packet loss data over a given VoIP route. The results are processed using a smoothing algorithm and are compared with user-configurable quality criteria to determine whether the route is offering an acceptable quality of service. If not, a QoS Monitor automatically blocks the unacceptable VoIP pathway so that subsequent calls are routed through an alternative, such as the SCN, for a user-defined period of time.

DETAILED DESCRIPTION OF THE PREFERRED EMBODIMENTS

Figure 1:
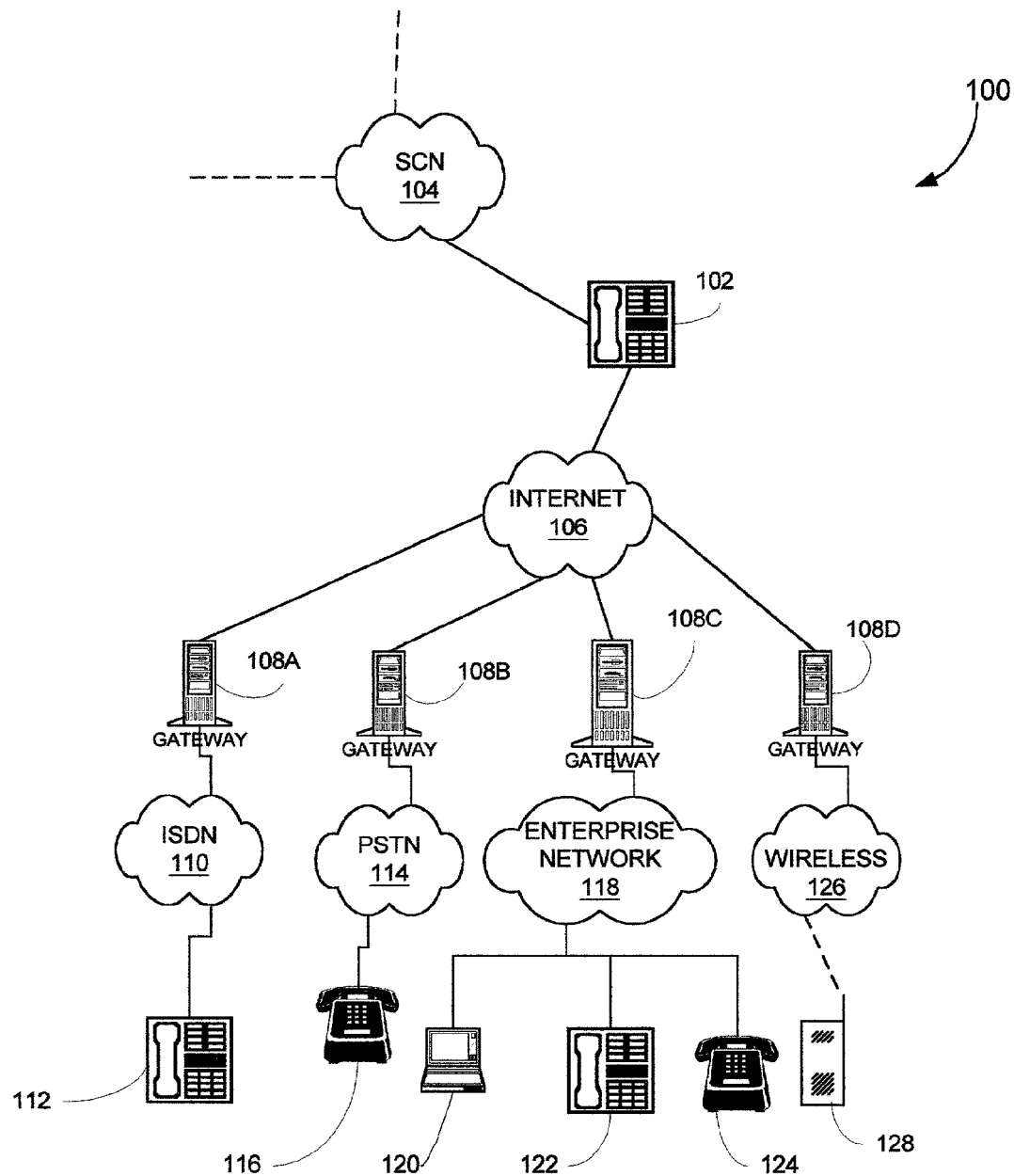
FIG. 1 is a block diagram of a telecommunications system of the background art, including a voice-over-IP connection.

A system 100 of the background art is shown in FIG. 1. System 100 picks up an analog voice signal, converts it to digital, and places it in packets. The packets are then routed to the recipient via the IP network and reconverted to an analog voice signal. The IP network uses User Datagram Protocol/Internet Protocol (UDP/IP) for transferring packets. VoIP manages the transmission of voice in packets using UDP/IP.

Various standards promulgated by the International Telecommunications Union (ITU) allow callers from different systems to communicate. As schematically depicted in FIG. 1, callers using a variety of devices including analog telephones, computers, laptop computers, ISDN telephones, and wireless devices can communicate with each other over VoIP connections.

System 100 includes an ITU Standard H.323 terminal 102 connected to the switched circuit network 104 and to the Internet 106. Terminal 102 can be, for example, a PC, a workstation, or an Ethernet-enabled telephone. According to ITU standards, H.323 terminals include at least one voice compressor/decompressor (CODEC) that sends and receives packetized audio; all H.323 terminals support Registration Admission Status Protocol (RAS), Real-Time Transport Protocol (RTP), and RTP Control Protocol (RTCP); all H.323 terminals support real-time, two-way audio communications with other H.323 entities, and may support multimedia such as audio, video, and data, or any combination of the three. An H.323 terminal typically includes a microphone/speaker including a CODEC such as ITU standard G.711 or G.729; a camera/display including a video CODEC such as ITU standard H.261; a system control user interface, including an ITU standard H.245 control channel, an ITU standard H.225 call control, and an RAS control.

A multipoint control unit (MCU) can be added to allow for conferencing functions between three or more terminals. An MCU can control and mix video, audio, and data from H.323 terminals. Typically, an MCU includes a multipoint controller that handles signaling and control for conferences, and a multipoint processor that accepts streams from LAN endpoints, replicates them and forwards them to the appropriate endpoints. In the illustrated embodiment, terminal 102 includes built-in multipoint control, implementing many of the functions of the MCU. As those skilled in the art are aware, gatekeepers can also be added to manage nodes and to provide address translation and routing and admission control.

Gateways 108A–108D are interfaces between the H.323 system and external networks. As seen in FIG. 1, gateway 108A interfaces with ISDN network 110, which in turn connects to an ISDN telephone 112; gateway 108B interfaces with PSTN 114, which in turn connects to an analog telephone 116; gateway 108C interfaces with an enterprise network 118, which connects to a computer 120, a digital telephone 122, and an analog telephone 124; and gateway 108D interfaces with wireless network 126, which in turn connects to a wireless communications device 128.

Gateways 108A–108D use CODECs to sample the signal from non-H.323 devices, digitize the signal, compress the data, and put the data into packets. Each gateway addresses the packets to the destination and then sends them over an IP network. The gateways also provide translation and protocol conversion between H.323 and non-H.323 devices.

For minor packet loss, the CODEC can perform some compensating functions, such as retransmission of the previous packet or interpolation. However, when packet loss exceeds a threshold (typically about 5%), or when a set of sequential packets is lost, voice quality can be significantly degraded.

Figure 2:
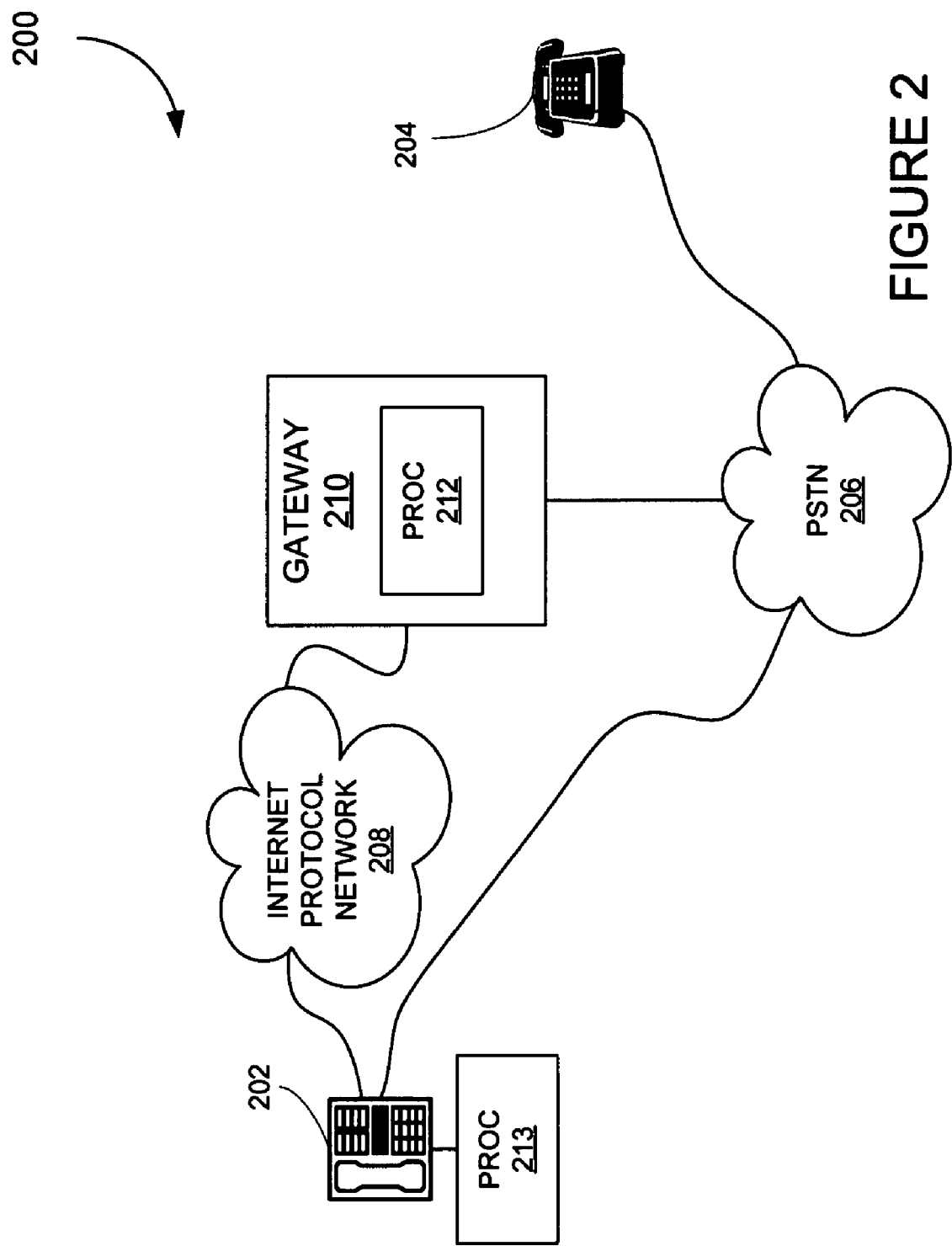
FIG. 2 is a block diagram of a voice-over-IP system illustrating a Quality-of-Service Monitor of the present invention.

A system 200 incorporating the present invention is illustrated in FIG. 2. In the example depicted in FIG. 2, an H.323 terminal 202 is in communication with an analog telephone 204. Terminal 202 connects to the PSTN 206 and an IP network 208. A gateway 210, including a processor 212, interfaces between PSTN 206 and the IP network 208. A processor 213 can also be incorporated in terminal 202.

System 200 evaluates packet loss data using a smoothing algorithm to assess system reliability and by extension, voice quality. The smoothing algorithm provides a way to adjust for transitory effects that may skew the results. Before blocking call transmission, it is advantageous to know that the connection is consistently bad, not just experiencing an aberration. For instance, if a call has dropped 1 percent of its packets during each of 100 RTCP intervals but drops 20 percent of its packets during the next interval, the smoothing algorithm will handle this as an irregularity. Instead of automatically increasing the average packet loss to a value which does not accurately reflect the very stable history of this connection, the occurrence of the packet loss spike will only affect the average percent packet loss to a minimal degree.

In a preferred embodiment, the system uses the Sliding Window Algorithm to set each output to a weighted average of the previous output and the latest sample ($S_i$). In the system's implementation of the Sliding Window Algorithm, a new computed smoothed loss $V_i$ is set to the weighted average of $V_{i-1}$ and $S_i$ according to the following formula, known as the Sliding Window Exponential Average Algorithm:

$$V_i = \alpha V_{i-1} + (1-\alpha) S_i$$

in which the variables are defined as follows:

$V_i$ is the computed smoothed percent packet loss.

$V_{i-1}$ is the smoothed percent packet loss calculated during the previous RTCP interval. This value represents the quality of the call to the remote IP address from call initiation up to the current RTCP interval.

$S_i$ is the percent packet loss representing the current interval.

$\alpha$ is the Route Blocking Sensitivity.

Several user-configurable variables are used in the implementation of the Sliding Window Exponential Average Algorithm: (1) the Blocking Duration, which is the time in minutes that a route will be blocked if its quality is deemed unacceptable; (2) the Route Blocking Threshold, which represents the packet loss percent threshold at which the route will be blocked; (3) the Route Blocking Sensitivity ("$\alpha$" above), which determines how fast the smoothing algorithm will react to changes in the rate of packet loss, thereby establishing the pervasiveness of the "memory" of the connection's packet loss history (the Route Blocking Sensitivity is limited to values between 0 and 1); (4) the Route Blocking Clamp, which affects how the smoothing algorithm reacts to sudden spikes in the packet loss, setting a maximum percent packet loss that will be used in the smoothing algorithm for a given interval. If the actual packet loss for an interval is greater than the value of the Route Blocking Clamp, the packet loss percentage value will be set to the clamped value. The Route Blocking Clamp exists to avoid distortions of the smoothing algorithm's results due to an unusually high packet loss percentage during a single interval; (5) the Minimum Call Duration, the interval for which a call must be maintained before it may be declared unacceptable. It is expressed in seconds, which are converted internally to a number of intervals; and (6) the RTCP Interval, which is the Real-time Transport Control Protocol reporting interval, generally between 5 and 9 seconds. The RTCP generates statistics relating to each interval, including the number of packets expected, the number of packets lost, and the average jitter value.

Figure 3:
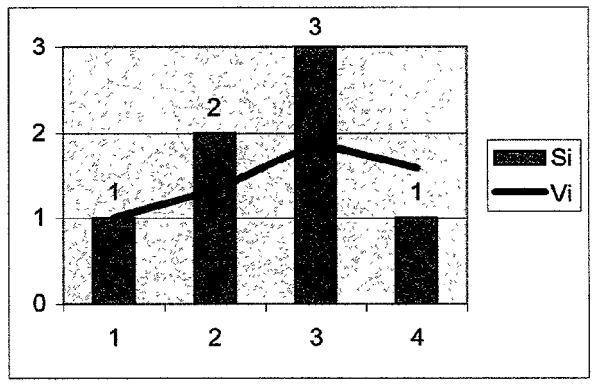
FIG. 3 is an illustration of the computation of smoothed packet loss in accordance with an algorithm of the present invention.

An example of the computation of smoothed percent packet loss in the Sliding Window Exponential Algorithm is illustrated in FIG. 3. A table 302 illustrates how the smoothed packet loss values are calculated. There are four samples $S_i$: 1, 2, 3, 1. Smoothed packet loss values $V_i$ are calculated from these $S_i$ values. Note the first sample $S_0$ is used as the "smoothed" $V_0$ without applying the formula as there is no history yet. The column headed "Expansion" illustrates that the effective coefficient in $V_i$ of a previous sample $S_{i-k}$ ($0 \leq k < i$) is $(1-\alpha) \cdot \alpha^k$ (thus the name exponential average). For example, in FIG. 3, where $\alpha = \frac{2}{3}$, the effective coefficient in $V_3$ of $S_1$ is $\frac{1}{3}(\frac{2}{3})^2$. A graph 304 illustrates the smoothing function. (In a preferred embodiment, $\alpha = \frac{1}{2}$, FIG. 3 uses $\alpha = \frac{2}{3}$ to allow $\alpha$ and $1-\alpha$ to be distinguished).

So long as the algorithm yields acceptable values, calls continue to be routed over the IP network. If, on the other hand, the value exceeds a threshold, a QoS Monitor blocks routing over the IP network and routes calls over an alternative network, such as the SCN or a wireless network. The QoS Monitor is a computer program that can be implemented in H.323 terminal 202, or in gateway 210, or distributed across 202 and 210. (In an H.323-to-H.323 call, gateways may not be needed; alternatively, an analog-to-analog call may be a VoIP call if both devices are mediated by a gateway.) Where an alternative packet-based routing system exists, the system may route calls over alternative packet-based routes.

When the QoS Monitor blocks network routing, a timer included in gateway 210 or, alternatively, in the terminal is started. When the timer runs out, the system again allows routing through the IP network. Packet loss continues to be monitored, and if packet loss again reaches unacceptable levels according to the Sliding Window Exponential Average Algorithm, the QoS Monitor again blocks network routing.

Figure 4:
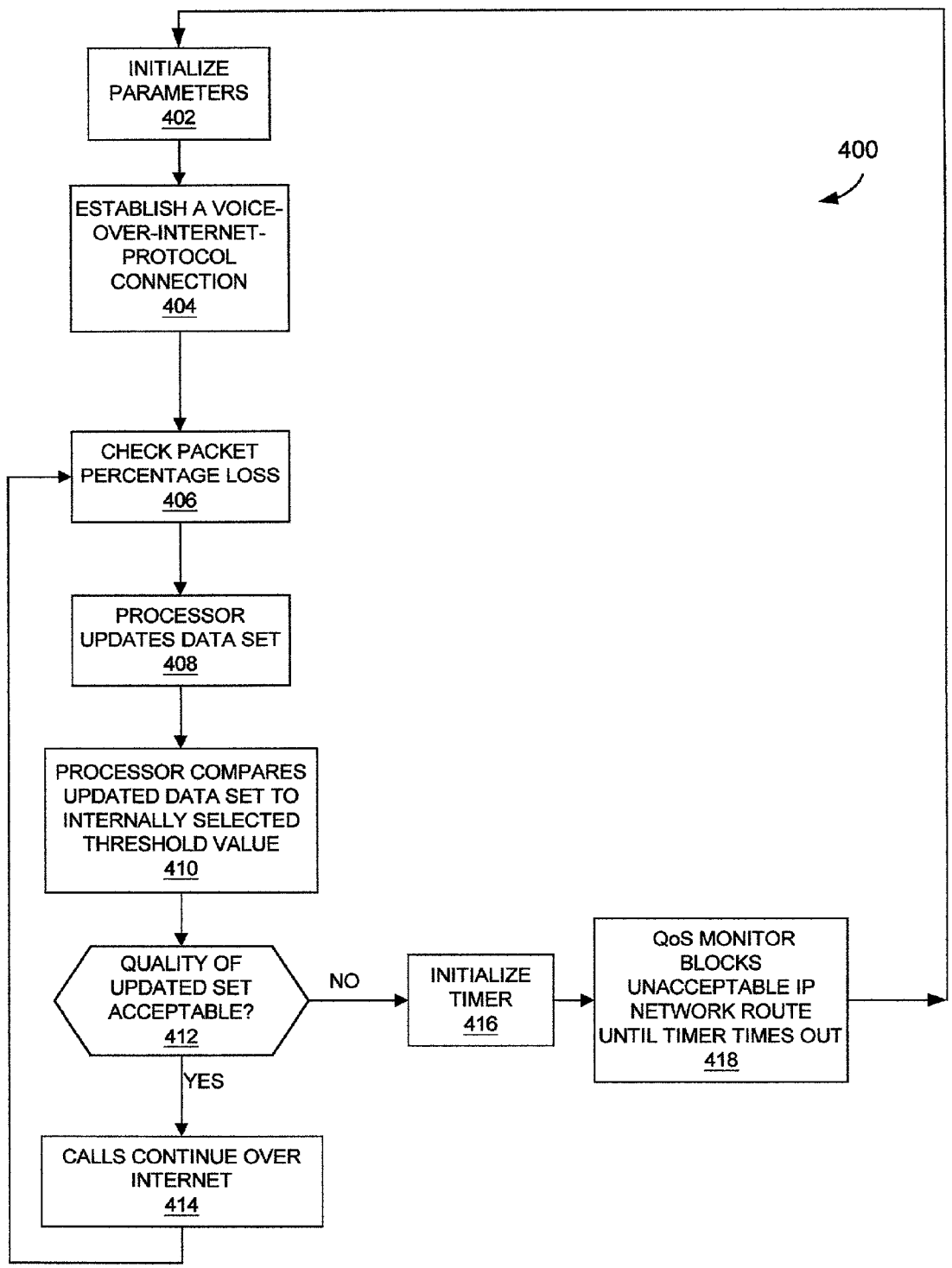
FIG. 4 is a flowchart of a method of the present invention.

A method 400 of the invention is shown in FIG. 4. At step 402, parameters are initialized. At step 404, a voice-over-Internet protocol connection is established. At step 406, the packet percentage loss is checked; in a preferred embodiment, the RTCP gathers the packet loss data and the QoS Monitor evaluates it. At step 408, the processor updates the data set.

At step 410, the processor associated with the QoS Monitor compares the updated data set to a selected threshold value. In a preferred embodiment, packet loss data are represented by a value computed by application of a smoothing algorithm such as the Sliding Window Algorithm Values can also be determined by other smoothing algorithms.

At a step 412, the processor associated with the QoS Monitor determines whether the quality of the updated set is acceptable. If yes, calls continue to be routed over the IP network, at step 414, and the method loops back to step 406, and continues to monitor the packet percentage loss.

If the quality is not acceptable, the method initializes a timer, at step 416. The QoS Monitor blocks the unacceptable IP network route until the timer times out, at step 418, so that future calls are not carried over it. Future calls can alternatively be switched to the PSTN, or can be routed over an alternative IP network route.

Figure 5:
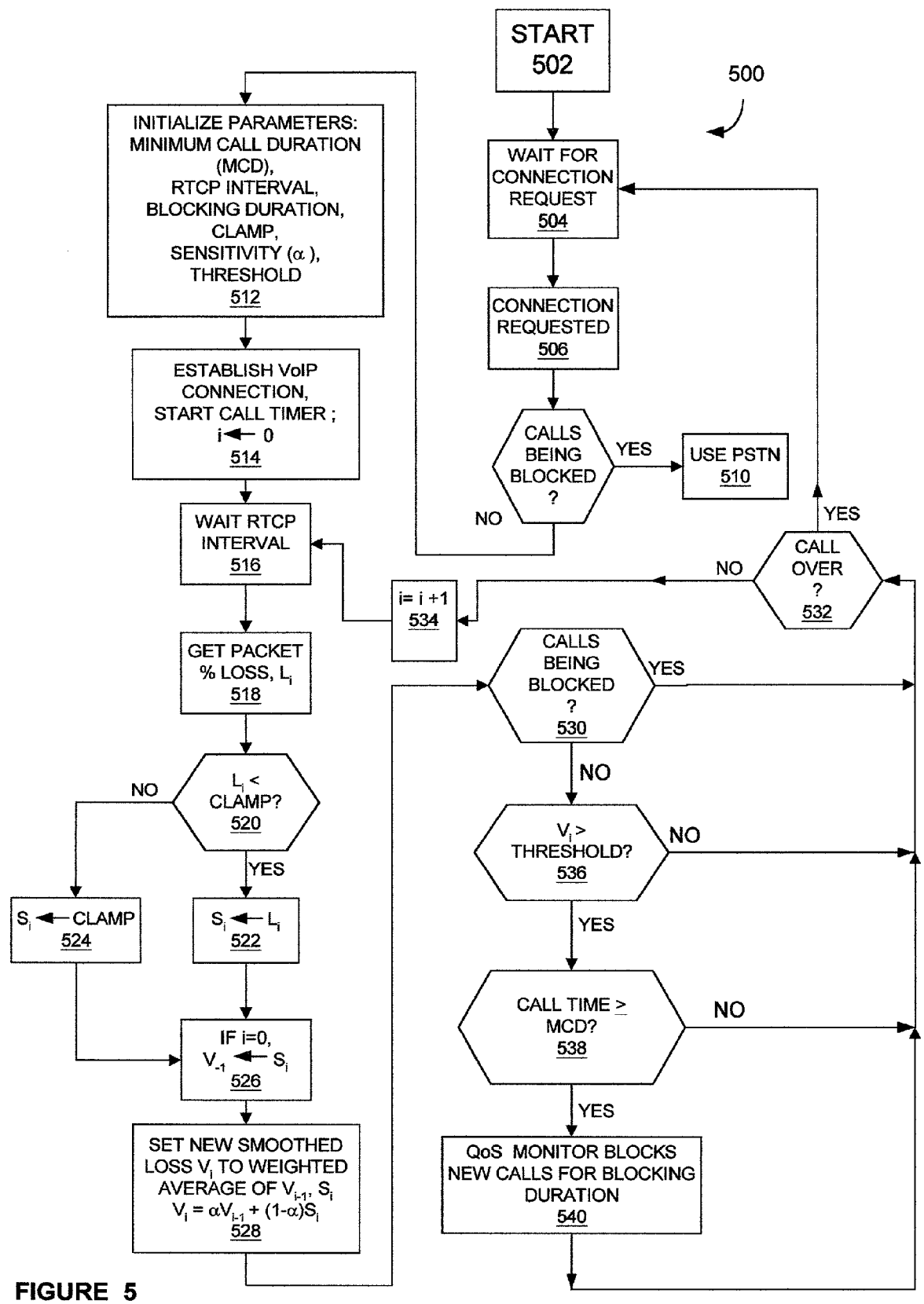
FIG. 5 is a flowchart of a more detailed method of the invention.

A more detailed method 500 of the invention is shown in FIG. 5. The method starts at step 502. The method waits for a connection request at step 504. At step 506, the connection is requested. At step 508, the method checks whether the QoS Monitor is currently blocking routes over the IP network.

If yes, the method routes the call over the PSIN or alternative, at step 510. If IP network routing is not being blocked by the QoS Monitor, parameters are initialized, at step 512. In a preferred embodiment, the parameters are Minimum Call Duration (MCD); RTCP Interval; Blocking Duration; Route Blocking Clamp; Sensitivity (α); and Threshold.

At step 514, a voice-over-Internet-protocol (VoIP) connection is established, and the interval is initialized to 0. At step 516, the method waits for an RTCP interval. At step 518, the RTCP determines the percentage packet loss, $L_i$. At a step 520, the method checks whether the value for $L_i$ is less than the value for the Route Blocking Clamp. If the value for $L_i$ is less than the value for the Route Blocking Clamp, the value for $S_i$ is set to $L_i$, at step 522. Otherwise, $S_i$ is set to the value of the Route Blocking Clamp, at step 524. In either case, the method moves to step 526, where, if it is the initial interval (i=0), $V_{-1}$ is set to the value of $S_i$.

The method then proceeds to step 528, where the new computed smoothed loss $V_i$ is set to the weighted average of $V_{i-1}$ and $S_i$ according to the Sliding Window Exponential Average Algorithm:

$$V_i = \alpha V_{i-1} + (1-\alpha) S_i$$

The method then proceeds to step 530, where it is determined whether blocking by the QoS Monitor is on. If yes, the method checks whether the current call is over, at step 532. If the current call is over, the method returns to step 504, and waits for a connection request. If, on the other hand, the current call is not over, the method proceeds to step 534, where interval number i is set to i +1, and then continues to gather statistics about the quality of the connection. The method then returns to step 516, and waits for another RTCP interval.

If, at step 530, the blocking is not on, the method proceeds to step 536, where it is determined whether $V_i$ is greater than the Route Blocking Threshold. If $V_i$ is not greater than the Route Blocking Threshold, the method proceeds to step 532 and proceeds as described above.

If $V_i$ is greater than the Route Blocking Threshold, the method proceeds to step 538, and checks whether the call time is greater than or equal to the Minimum Call Duration (MCD). If not, the method again proceeds to step 532. If the call time is greater than or equal to the MCD, the method turns QoS Monitor blocking on for the blocking duration, at step 540. After the blocking is turned on at step 540, the method proceeds to step 532 and the steps following.

The configuration of components is a matter of design choice; other configurations will be well known to those skilled in the art. The apparatus and method are compatible with other protocols and devices. Other smoothing algorithms can be used. The system can be used to assess the quality of calls in progress, and existing calls can be dynamically monitored and rerouted. The apparatus and method can be used with IP networks including intranets and the Internet. The apparatus and method can simultaneously monitor multiple calls, e.g., to a common IP destination, to improve the sampling statistics. If separate values of smoothed packet loss $V_i$ are tracked for each call, then the value consulted for prospective calls can be either the most recently written $V_i$ or, alternatively, an average of $V_i$ values across current calls. Alternatively, a single $V_i$ can be kept, pooling data for the different calls. Other network systems are compatible with the invention. The compatibility of the invention with the use of other components such as routers and gatekeepers will be known to those skilled in the art. Those skilled in the art will be aware of numerous variations within the bounds of the invention, the scope of which is limited only by the following claims.

What is claimed is:

1. A method for blocking the routing of voice calls over an IP network when a packet loss measure rises above a threshold, said method comprising the steps:

a terminal transmitting voice calls, said terminal being connected to the IP network;

at least one processor collecting data on packet loss for each of a plurality of nonoverlapping time intervals in a current connection over the IP network and evaluating the packet loss data according to a predetermined algorithm, wherein said algorithm computes an output for each time interval that is a function of the packet loss data for that interval and at least one prior interval, and if the results of the evaluation fail to meet a predetermined criterion, blocking future calls over the IP network path;

wherein the function is a weighted average in which said weighted average for an interval is the weighted average of the packet loss data for said interval and the value of said weighted average for the prior interval;

wherein a fraction α between 0 and 1 is specified, and the weights attached to the packet loss data and to the prior weighted average are α and 1−α, respectively.

2. A method as in claim 1 wherein data on packet loss are collected simultaneously on multiple connections over the IP network.

3. A method as in claim 2 wherein data from different connections are evaluated separately.

4. A method as in claim 3 wherein the most recently evaluated connection is consulted to determine whether to block calls.

5. A method as in claim 3 wherein an average of evaluations across current connections is consulted to determine whether to block calls.

6. A method as in claim 2 wherein data from different connections are pooled.

* * * * *